US011723092B2

(12) United States Patent
Hughes et al.

(10) Patent No.: US 11,723,092 B2
(45) Date of Patent: Aug. 8, 2023

(54) SYSTEM AND METHOD FOR IMPLEMENTING A BLUETOOTH DEVICE MANAGER MODULE

(71) Applicant: JPMorgan Chase Bank, N.A., New York, NY (US)

(72) Inventors: Stephen Anthony Hughes, Sidcup (GB); Suresh Thankappan, Shrewsbury, MA (US)

(73) Assignee: JPMORGAN CHASE BANK, N.A., New York, NY (US)

(*) Notice: Subject to any disclaimer, the term of this patent is extended or adjusted under 35 U.S.C. 154(b) by 126 days.

(21) Appl. No.: 17/449,522

(22) Filed: Sep. 30, 2021

(65) Prior Publication Data

US 2022/0132604 A1     Apr. 28, 2022

Related U.S. Application Data

(60) Provisional application No. 63/106,145, filed on Oct. 27, 2020.

(51) Int. Cl.
*H04W 4/00* (2018.01)
*H04W 76/14* (2018.01)
*H04L 67/08* (2022.01)
*H04W 48/16* (2009.01)
*H04W 48/18* (2009.01)

(52) U.S. Cl.
CPC .............. *H04W 76/14* (2018.02); *H04L 67/08* (2013.01); *H04W 48/16* (2013.01); *H04W 48/18* (2013.01)

(58) Field of Classification Search
CPC ..... H04W 76/14; H04W 48/16; H04W 48/18; H04L 67/08
USPC ......................................................... 370/329
See application file for complete search history.

(56) References Cited

U.S. PATENT DOCUMENTS

| | | | |
|---|---|---|---|
| 10,887,367 B2* | 1/2021 | Domnich | ............... H04L 65/65 |
| 11,201,902 B2* | 12/2021 | Domnich | ............... H04L 67/01 |
| 11,521,643 B2* | 12/2022 | Laberge | ................. G10L 25/78 |
| 2004/0254685 A1* | 12/2004 | Williams | ............... A01G 25/16 |
| | | | 700/286 |
| 2013/0065564 A1* | 3/2013 | Conner | .............. G06K 19/0718 |
| | | | 340/5.82 |
| 2017/0279957 A1* | 9/2017 | Abramson et al. | . H04M 1/6075 |
| 2018/0115858 A1* | 4/2018 | Raghavendra | ........ H04W 4/026 |
| 2018/0176713 A1* | 6/2018 | Linsky | .................. H04W 76/14 |

(Continued)

*Primary Examiner* — Marceau Milord
(74) *Attorney, Agent, or Firm* — Greenblum & Bernstein, P.L.C.

(57) ABSTRACT

A system and method for BT device management are disclosed. An end user application and a desktop BT device management application running on a VDI (virtual desktop infrastructure) session of a remote desktop are provided. A processor transmits a first command from the VDI session to an operating system running on a BT thin client device and scans all available BT thin client devices that are in pairing mode. The BT thin client devices that are in pairing mode are displayed on a window of the remote desktop. A user input is received to select a desired BT thin client device from the available BT thin client devices. The processor transmits a second command from the operating system running on the BT thin client device to a BT dongle attached to the BT thin client device to pair the selected BT thin client device to the remote desktop.

20 Claims, 6 Drawing Sheets

(56) References Cited

U.S. PATENT DOCUMENTS

| | | | |
|---|---|---|---|
| 2019/0026716 A1* | 1/2019 | Anbukkarasu | G06Q 20/308 |
| 2019/0281450 A1* | 9/2019 | Lu | H04W 4/80 |
| 2019/0297133 A1* | 9/2019 | Domnich | H04L 67/565 |
| 2021/0092179 A1* | 3/2021 | Domnich | H04L 67/01 |
| 2022/0078223 A1* | 3/2022 | Domnich | H04L 67/01 |

* cited by examiner

SYSTEM AND METHOD FOR IMPLEMENTING A BLUETOOTH DEVICE MANAGER MODULE

CROSS-REFERENCE TO RELATED APPLICATIONS

This application claims the benefit of priority from U.S. Provisional Patent Application No. 63/106,145, filed Oct. 27, 2020, which is herein incorporated by reference in its entirety.

TECHNICAL FIELD

This disclosure generally relates to Bluetooth device management, and, more particularly, to methods and apparatuses for implementing a Bluetooth device manager module that allows users to connect their approved personal device to corporate devices, managed through a central policy engine to adhere to control and cybersecurity standards.

BACKGROUND

The developments described in this section are known to the inventors. However, unless otherwise indicated, it should not be assumed that any of the developments described in this section qualify as prior art merely by virtue of their inclusion in this section, or that those developments are known to a person of ordinary skill in the art.

There is a desire for many employees of a corporation or organization or firm to purchase their own Bluetooth headsets and connect to their corporate devices for use in the office. Often, some employees do not wish to use office provided headsets or have invested in high quality devices of their own. Further, the recent release of the Apple AirPods has brought additional demand for the ability and desire to have freedom to choose and leverage personal owned peripherals. In addition, the recent Covid19 pandemic has made many employees aware of the risks associated with sharing devices across employees, or way to effectively be able to sanitize peripherals such as headsets. Moreover, employees working remotely would like the ability to also use their own Bluetooth Keyboards and Mice/Trackpads at home, while working on their corporate laptops.

Currently, conventional operating systems (e.g., Mac, Windows, etc.) does not have policy controls to enable only specific types of Bluetooth devices whilst allowing others to be blocked in a managed way. There do not appear to be products in today's market that meet this need. Some thin-client (e.g., a device that delivers virtual desktop to end users remotely) devices may not include a Bluetooth receiver, and therefore, would need to be sourced and managed. In addition, conventional devices lack management tools to manage and control device and user policies and do not provide inventory management and firmware updates for multi-vendor devices.

Thus, there is an increasing demand to enable employees to leverage personally owned headsets for use in the office.

SUMMARY

The present disclosure, through one or more of its various aspects, embodiments, and/or specific features or sub-components, provides, among other features, various systems, servers, devices, methods, media, programs, and platforms for implementing a Bluetooth device manager module that allows users to connect their approved personal device to corporate devices, managed through a central policy engine to adhere to control and cybersecurity standards, but the disclosure is not limited thereto.

The present disclosure, through one or more of its various aspects, embodiments, and/or specific features or sub-components, also provides, among other features, various systems, servers, devices, methods, media, programs, and platforms for implementing a Bluetooth device manager module to allow a user to better control allowed and disallowed devices, for example, limiting down to specific devices or manufacturers, but the disclosure is not limited thereto.

The present disclosure, through one or more of its various aspects, embodiments, and/or specific features or sub-components, also provides, among other features, various systems, servers, devices, methods, media, programs, and platforms for implementing a Bluetooth device manager module that may be configured to build central policies to ensure that only administrators can control device settings, thereby delivering a simple user interface to allow users to pair and manage their own devices, within the realms of what is permitted in the policies, but the disclosure is not limited thereto.

In addition, the present disclosure, through one or more of its various aspects, embodiments, and/or specific features or sub-components, also provides, among other features, various systems, servers, devices, methods, media, programs, and platforms for implementing a Bluetooth device manager module that may be configured to certify a standard and globally available Bluetooth dongle for a thin-client device.

According to an aspect of the present disclosure, a method for implementing a Bluetooth device manager module by utilizing one or more processors and one or more memories is disclosed. The method may include: establishing a first communication channel between an end user application and a desktop BT device management application running on a VDI (virtual desktop infrastructure) session of a remote desktop; transmitting, via a second communication channel, a first command from the VDI session by utilizing the desktop BT device management application to an operating system running on a BT thin client device; scanning, in response to transmitting the first command, all available BT thin client devices that are in pairing mode; displaying the BT thin client devices that are in pairing mode on a window of the remote desktop; receiving a user input to select a desired BT thin client device from the available BT thin client devices that are in pairing mode; and transmitting a second command, in response to the user input, from the operating system running on the BT thin client device to a BT dongle attached to the BT thin client device to pair the selected BT thin client device to the remote desktop.

According to another aspect of the present disclosure, the operating system may be a Linux operating system running on the thin client device supporting a cloud-based system or platform (e.g., JETS), but the disclosure is not limited thereto.

According to an additional aspect of the present disclosure, the second communication channel is a secured virtual channel.

According to a further aspect of the present disclosure, the BT thin client device may be a headset, or a Bluetooth enabled speaker or a keyboard, or a mouse, but the disclosure is not limited thereto.

According to yet another aspect of the present disclosure, the BT dongle that is attached to the BT thin client device is located external to the remote desktop.

According to another aspect of the present disclosure, wherein in response to the pairing of the selected desired BT thin client device to the remote desktop, the remote desktop runs a data center whereas an actual physical machine of the BT dongle that runs the remote desktop is located in the BT thin client device.

According to a further aspect of the present disclosure, the method may further include: displaying a BT icon on a task bar of the remote desktop to ensure that a secured connection has been established between the remote desktop and the BT dongle.

According to yet another aspect of the present disclosure, the method may further include: setting a predefined perimeter around the remote desktop; detecting that the BT thin client device is outside of the predefined perimeter; and automatically disconnecting the pair between the remote desktop and the BT dongle.

According to a further aspect of the present disclosure, the method may further include: establishing a secured connection between the remote desktop and the BT dongle; storing information onto a database indicating that the BT thin client device is a trusted thin client device; setting a predefined perimeter around the remote desktop; detecting that the BT thin client device is outside of the predefined perimeter; automatically disconnecting the pair between the remote desktop and the BT dongle; detecting that the BT thin client device is again inside of the predefined perimeter for a consecutive time; and automatically connecting the pair between the remote desktop and the BT dongle.

According to an additional aspect of the present disclosure, the method may further include: providing a remote management portal; setting, by utilizing the remote management portal, a device-based policy for each of the BT thin client devices indicating whether such BT thin client device is authorized for connecting to the remote desktop; maintaining a list of authorized BT thin client devices on the remote management portal based the device-based policy; periodically accessing, by the operating system, the remote management portal to read the device-based policy when the second command is detected; refreshing, by the operating system, the device-based policy when it is determined that an unauthorized BT thin client device is seeking connection; and updating the list of authorized BT thin client devices based on the refreshed device-based policy.

According to yet another aspect of the present disclosure, the method may further include: providing a remote management portal; setting, by utilizing the remote management portal, a user-based policy for each user who is authorized for connecting to the remote desktop; maintaining a list of authorized users on the remote management portal based the user-based policy; periodically accessing, by the VDI session running on the remote desktop, the remote management portal to read the user-based policy when the second command is detected; refreshing, by the VDI session running on the remote desktop, the user-based policy when it is determined that an unauthorized user is seeking connection; and updating the list of authorized users based on the refreshed user-based policy.

According to an additional aspect of the present disclosure, the method may further include requesting supported command-sets and capabilities from the attached BT thin client device, including manufacture specifics; and controlling functionalities of the BT thin client device from the end user application as necessary (e.g., power transmission, echo cancellation, etc. but the disclosure is not limited thereto).

According to another aspect of the present disclosure, a system for implementing a BT device manager module for BT device management is disclosed. The system may include: a processor and one or more memories operatively connected to the processor via a communication network, wherein the processor may be configured to: establish a first communication channel between an end user application and a desktop BT device management application running on a VDI session of a remote desktop; transmit, via a second communication channel, a first command from the VDI session by utilizing the desktop BT device management application to an operating system running on a BT thin client device; scan, in response to transmitting the first command, all available BT thin client devices that are in pairing mode; display the BT thin client devices that are in pairing mode on a window of the remote desktop; receive a user input to select a desired BT thin client device from the available BT thin client devices that are in pairing mode; and transmit a second command, in response to the user input, from the operating system running on the BT thin client device to a BT dongle attached to the BT thin client device to pair the selected BT thin client device to the remote desktop.

According to yet another aspect of the present disclosure, the processor may be further configured to: cause a display to display a BT icon on a task bar of the remote desktop to ensure that a secured connection has been established between the remote desktop and the BT dongle.

According to a further aspect of the present disclosure, the processor may be further configured to: set a predefined perimeter around the remote desktop; detect that the BT thin client device is outside of the predefined perimeter; and automatically disconnect the pair between the remote desktop and the BT dongle.

According to an additional aspect of the present disclosure, the processor may be further configured to: establish a secured connection between the remote desktop and the BT dongle; store information onto a database indicating that the BT thin client device is a trusted thin client device; set a predefined perimeter around the remote desktop; detect that the BT thin client device is outside of the predefined perimeter; automatically disconnect the pair between the remote desktop and the BT dongle; detect that the BT thin client device is again inside of the predefined perimeter for a consecutive time; and automatically connect the pair between the remote desktop and the BT dongle.

According to another aspect of the present disclosure, the system may include a remote management portal and the processor may be further configured to: set, by utilizing the remote management portal, a device-based policy for each of the BT thin client devices indicating whether such BT thin client device is authorized for connecting to the remote desktop; maintain a list of authorized BT thin client devices on the remote management portal based the device-based policy; periodically access, by the operating system, the remote management portal to read the device-based policy when the second command is detected; refresh, by the operating system, the device-based policy when it is determined that an unauthorized BT thin client device is seeking connection; and update the list of authorized BT thin client devices based on the refreshed device-based policy.

According to yet another aspect of the present disclosure, the system may include a remote management portal and the processor may be further configured to: set, by utilizing the remote management portal, a user-based policy for each user who is authorized for connecting to the remote desktop; maintain a list of authorized users on the remote management portal based the user-based policy; periodically access, by the VDI session running on the remote desktop, the remote management portal to read the user-based policy when the second command is detected; refresh, by the VDI session running on the remote desktop, the user-based policy when it is determined that an unauthorized user is seeking connection; and update the list of authorized users based on the refreshed user-based policy.

According to a further aspect of the present disclosure, a non-transitory computer readable medium configured to store instructions for implementing a BT device manager module for BT device management is disclosed. The instructions, when executed, may cause a processor to perform the following: establishing a first communication channel between an end user application and a desktop BT device management application running on a VDI (virtual desktop infrastructure) session of a remote desktop; transmitting, via a second communication channel, a first command from the VDI session by utilizing the desktop BT device management application to an operating system running on a BT thin client device; scanning, in response to transmitting the first command, all available BT thin client devices that are in pairing mode; displaying the BT thin client devices that are in pairing mode on a window of the remote desktop; receiving a user input to select a desired BT thin client device from the available BT thin client devices that are in pairing mode; and transmitting a second command, in response to the user input, from the operating system running on the BT thin client device to a BT dongle attached to the BT thin client device to pair the selected BT thin client device to the remote desktop.

According to yet another aspect of the present disclosure, the instructions, when executed, may further cause the processor to: cause a display to display a BT icon on a task bar of the remote desktop to ensure that a secured connection has been established between the remote desktop and the BT dongle.

According to a further aspect of the present disclosure, the instructions, when executed, may further cause the processor to: set a predefined perimeter around the remote desktop; detect that the BT thin client device is outside of the predefined perimeter; and automatically disconnect the pair between the remote desktop and the BT dongle.

According to an additional aspect of the present disclosure, the instructions, when executed, may further cause the processor to: establish a secured connection between the remote desktop and the BT dongle; store information onto a database indicating that the BT thin client device is a trusted thin client device; set a predefined perimeter around the remote desktop; detect that the BT thin client device is outside of the predefined perimeter; automatically disconnect the pair between the remote desktop and the BT dongle; detect that the BT thin client device is again inside of the predefined perimeter for a consecutive time; and automatically connect the pair between the remote desktop and the BT dongle.

According to another aspect of the present disclosure, the instructions, when executed, may further cause the processor to: set, by utilizing a remote management portal, a device-based policy for each of the BT thin client devices indicating whether such BT thin client device is authorized for connecting to the remote desktop; maintain a list of authorized BT thin client devices on the remote management portal based the device-based policy; periodically access, by the operating system, the remote management portal to read the device-based policy when the second command is detected; refresh, by the operating system, the device-based policy when it is determined that an unauthorized BT thin client device is seeking connection; and update the list of authorized BT thin client devices based on the refreshed device-based policy.

According to yet another aspect of the present disclosure, the instructions, when executed, may further cause the processor to: set, by utilizing a remote management portal, a user-based policy for each user who is authorized for connecting to the remote desktop; maintain a list of authorized users on the remote management portal based the user-based policy; periodically access, by the VDI session running on the remote desktop, the remote management portal to read the user-based policy when the second command is detected; refresh, by the VDI session running on the remote desktop, the user-based policy when it is determined that an unauthorized user is seeking connection; and update the list of authorized users based on the refreshed user-based policy.

BRIEF DESCRIPTION OF THE DRAWINGS

The present disclosure is further described in the detailed description which follows, in reference to the noted plurality of drawings, by way of non-limiting examples of preferred embodiments of the present disclosure, in which like characters represent like elements throughout the several views of the drawings.

DETAILED DESCRIPTION

Figure 1:
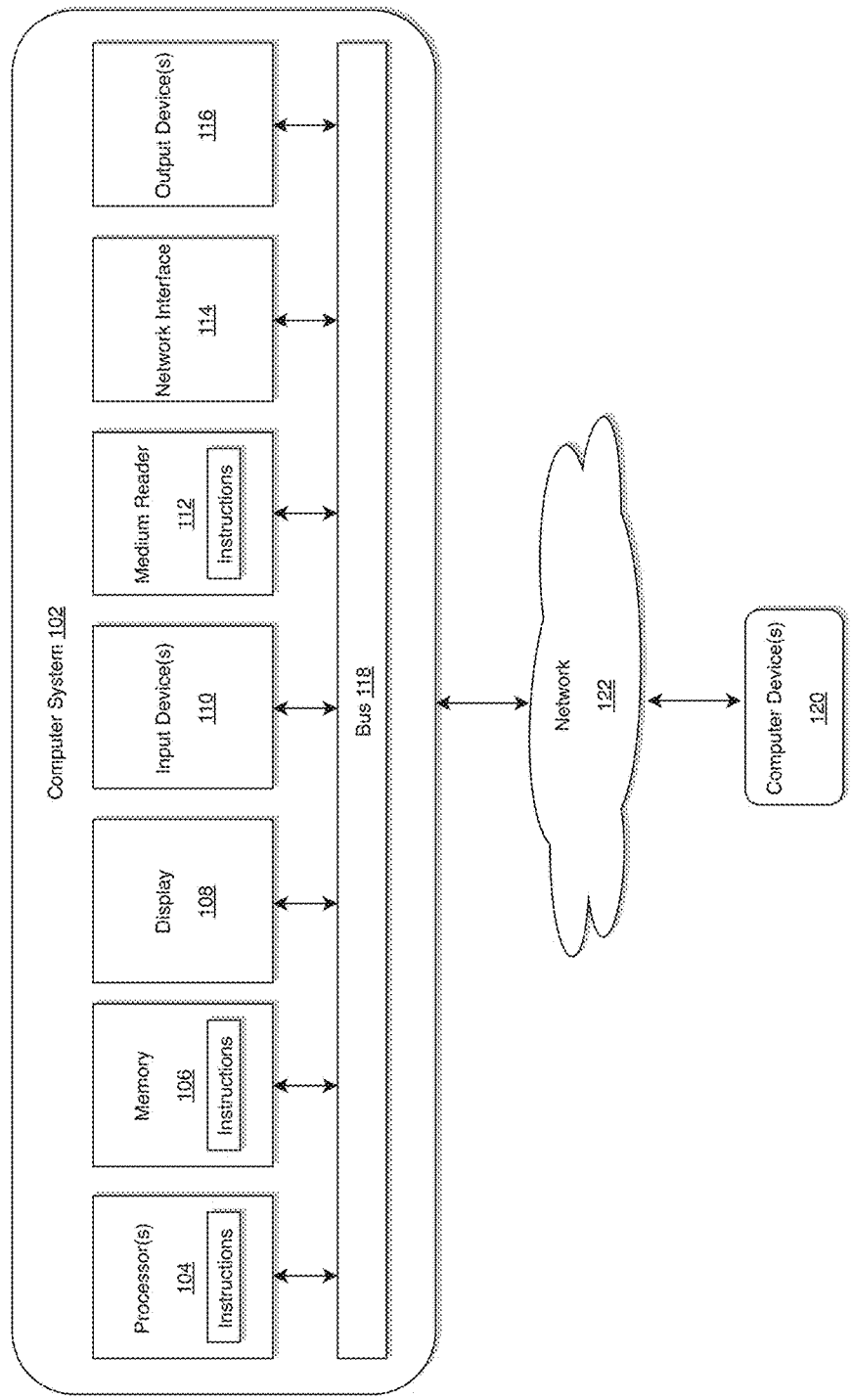
FIG. 1 illustrates a computer system for implementing a BT device manager device for BT device management in accordance with an exemplary embodiment.

Through one or more of its various aspects, embodiments and/or specific features or sub-components of the present disclosure, are intended to bring out one or more of the advantages as specifically described above and noted below.

The examples may also be embodied as one or more non-transitory computer readable media having instructions stored thereon for one or more aspects of the present technology as described and illustrated by way of the examples herein. The instructions in some examples include executable code that, when executed by one or more processors, cause the processors to carry out steps necessary to implement the methods of the examples of this technology that are described and illustrated herein.

As is traditional in the field of the present disclosure, example embodiments are described, and illustrated in the drawings, in terms of functional blocks, units and/or modules. Those skilled in the art will appreciate that these blocks, units and/or modules are physically implemented by electronic (or optical) circuits such as logic circuits, discrete components, microprocessors, hard-wired circuits, memory elements, wiring connections, and the like, which may be formed using semiconductor-based fabrication techniques or other manufacturing technologies. In the case of the blocks, units and/or modules being implemented by microprocessors or similar, they may be programmed using software (e.g., microcode) to perform various functions discussed herein and may optionally be driven by firmware and/or software. Alternatively, each block, unit and/or module may be implemented by dedicated hardware, or as a combination of dedicated hardware to perform some functions and a processor (e.g., one or more programmed microprocessors and associated circuitry) to perform other functions. Also, each block, unit and/or module of the example embodiments may be physically separated into two or more interacting and discrete blocks, units and/or modules without departing from the scope of the inventive concepts. Further, the blocks, units and/or modules of the example embodiments may be physically combined into more complex blocks, units and/or modules without departing from the scope of the present disclosure.

FIG. 1 is an exemplary system for use in accordance with the embodiments described herein for implementing a Bluetooth device manager module that allows users to connect their approved personal device to corporate devices, managed through a central policy engine to adhere to control and cybersecurity standards, but the disclosure is not limited thereto. The system 100 is generally shown and may include a computer system 102, which is generally indicated.

The computer system 102 may include a set of instructions that can be executed to cause the computer system 102 to perform any one or more of the methods or computer-based functions disclosed herein, either alone or in combination with the other described devices. The computer system 102 may operate as a standalone device or may be connected to other systems or peripheral devices. For example, the computer system 102 may include, or be included within, any one or more computers, servers, systems, communication networks or cloud environment. Even further, the instructions may be operative in such cloud-based computing environment.

In a networked deployment, the computer system 102 may operate in the capacity of a server or as a client user computer in a server-client user network environment, a client user computer in a cloud computing environment, or as a peer computer system in a peer-to-peer (or distributed) network environment. The computer system 102, or portions thereof, may be implemented as, or incorporated into, various devices, such as a personal computer, a tablet computer, a set-top box, a personal digital assistant, a mobile device, a palmtop computer, a laptop computer, a desktop computer, a communications device, a wireless smart phone, a personal trusted device, a wearable device, a global positioning satellite (GPS) device, a web appliance, or any other machine capable of executing a set of instructions (sequential or otherwise) that specify actions to be taken by that machine. Further, while a single computer system 102 is illustrated, additional embodiments may include any collection of systems or sub-systems that individually or jointly execute instructions or perform functions. The term system shall be taken throughout the present disclosure to include any collection of systems or sub-systems that individually or jointly execute a set, or multiple sets, of instructions to perform one or more computer functions.

As illustrated in FIG. 1, the computer system 102 may include at least one processor 104. The processor 104 is tangible and non-transitory. As used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The processor 104 is an article of manufacture and/or a machine component. The processor 104 is configured to execute software instructions in order to perform functions as described in the various embodiments herein. The processor 104 may be a general-purpose processor or may be part of an application specific integrated circuit (ASIC). The processor 104 may also be a microprocessor, a microcomputer, a processor chip, a controller, a microcontroller, a digital signal processor (DSP), a state machine, or a programmable logic device. The processor 104 may also be a logical circuit, including a programmable gate array (PGA) such as a field programmable gate array (FPGA), or another type of circuit that includes discrete gate and/or transistor logic. The processor 104 may be a central processing unit (CPU), a graphics processing unit (GPU), or both. Additionally, any processor described herein may include multiple processors, parallel processors, or both. Multiple processors may be included in, or coupled to, a single device or multiple devices.

The computer system 102 may also include a computer memory 106. The computer memory 106 may include a static memory, a dynamic memory, or both in communication. Memories described herein are tangible storage mediums that can store data and executable instructions, and are non-transitory during the time instructions are stored therein. Again, as used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The memories are an article of manufacture and/or machine component. Memories described herein are computer-readable mediums from which data and executable instructions can be read by a computer. Memories as described herein may be random access memory (RAM), read only memory (ROM), flash memory, electrically programmable read only memory (EPROM), electrically erasable programmable read-only memory (EEPROM), registers, a hard disk, a cache, a removable disk, tape, compact disk read only memory (CD-ROM), digital versatile disk (DVD), floppy disk, blu-ray disk, or any other form of storage medium known in the art. Memories may be volatile or non-volatile, secure and/or encrypted, unsecure and/or unencrypted. Of course, the computer memory 106 may comprise any combination of memories or a single storage.

The computer system 102 may further include a display 108, such as a liquid crystal display (LCD), an organic light emitting diode (OLED), a flat panel display, a solid-state display, a cathode ray tube (CRT), a plasma display, or any other known display.

The computer system 102 may also include at least one input device 110, such as a keyboard, a touch-sensitive input screen or pad, a speech input, a mouse, a remote control device having a wireless keypad, a microphone coupled to a speech recognition engine, a camera such as a video camera or still camera, a cursor control device, a global positioning system (GPS) device, an altimeter, a gyroscope, an accelerometer, a proximity sensor, or any combination thereof. Those skilled in the art appreciate that various embodiments of the computer system 102 may include multiple input devices 110. Moreover, those skilled in the art further appreciate that the above-listed, exemplary input devices 110 are not meant to be exhaustive and that the computer system 102 may include any additional, or alternative, input devices 110.

The computer system 102 may also include a medium reader 112 which is configured to read any one or more sets of instructions, e.g., software, from any of the memories described herein. The instructions, when executed by a processor, can be used to perform one or more of the methods and processes as described herein. In a particular embodiment, the instructions may reside completely, or at least partially, within the memory 106, the medium reader 112, and/or the processor 110 during execution by the computer system 102.

Furthermore, the computer system 102 may include any additional devices, components, parts, peripherals, hardware, software or any combination thereof which are commonly known and understood as being included with or within a computer system, such as, but not limited to, a network interface 114 and an output device 116. The output device 116 may be, but is not limited to, a speaker, an audio out, a video out, a remote control output, a printer, or any combination thereof.

Each of the components of the computer system 102 may be interconnected and communicate via a bus 118 or other communication link. As shown in FIG. 1, the components may each be interconnected and communicate via an internal bus. However, those skilled in the art appreciate that any of the components may also be connected via an expansion bus. Moreover, the bus 118 may enable communication via any standard or other specification commonly known and understood such as, but not limited to, peripheral component interconnect, peripheral component interconnect express, parallel advanced technology attachment, serial advanced technology attachment, etc.

The computer system 102 may be in communication with one or more additional computer devices 120 via a network 122. The network 122 may be, but is not limited to, a local area network, a wide area network, the Internet, a telephony network, a short-range network, or any other network commonly known and understood in the art. The short-range network may include, for example, Bluetooth, Zigbee, infrared, near field communication, ultraband, or any combination thereof. Those skilled in the art appreciate that additional networks 122 which are known and understood may additionally or alternatively be used and that the exemplary networks 122 are not limiting or exhaustive. Also, while the network 122 is shown in FIG. 1 as a wireless network, those skilled in the art appreciate that the network 122 may also be a wired network.

The additional computer device 120 is shown in FIG. 1 as a personal computer. However, those skilled in the art appreciate that, in alternative embodiments of the present application, the computer device 120 may be a laptop computer, a tablet PC, a personal digital assistant, a mobile device, a palmtop computer, a desktop computer, a communications device, a wireless telephone, a personal trusted device, a web appliance, a server, or any other device that is capable of executing a set of instructions, sequential or otherwise, that specify actions to be taken by that device. Of course, those skilled in the art appreciate that the above-listed devices are merely exemplary devices and that the device 120 may be any additional device or apparatus commonly known and understood in the art without departing from the scope of the present application. For example, the computer device 120 may be the same or similar to the computer system 102. Furthermore, those skilled in the art similarly understand that the device may be any combination of devices and apparatuses.

Of course, those skilled in the art appreciate that the above-listed components of the computer system 102 are merely meant to be exemplary and are not intended to be exhaustive and/or inclusive. Furthermore, the examples of the components listed above are also meant to be exemplary and similarly are not meant to be exhaustive and/or inclusive.

In accordance with various embodiments of the present disclosure, the methods described herein may be implemented using a hardware computer system that executes software programs. Further, in an exemplary, non-limited embodiment, implementations can include distributed processing, component/object distributed processing, and an operation mode having parallel processing capabilities. Virtual computer system processing can be constructed to implement one or more of the methods or functionality as described herein, and a processor described herein may be used to support a virtual processing environment.

Figure 2:
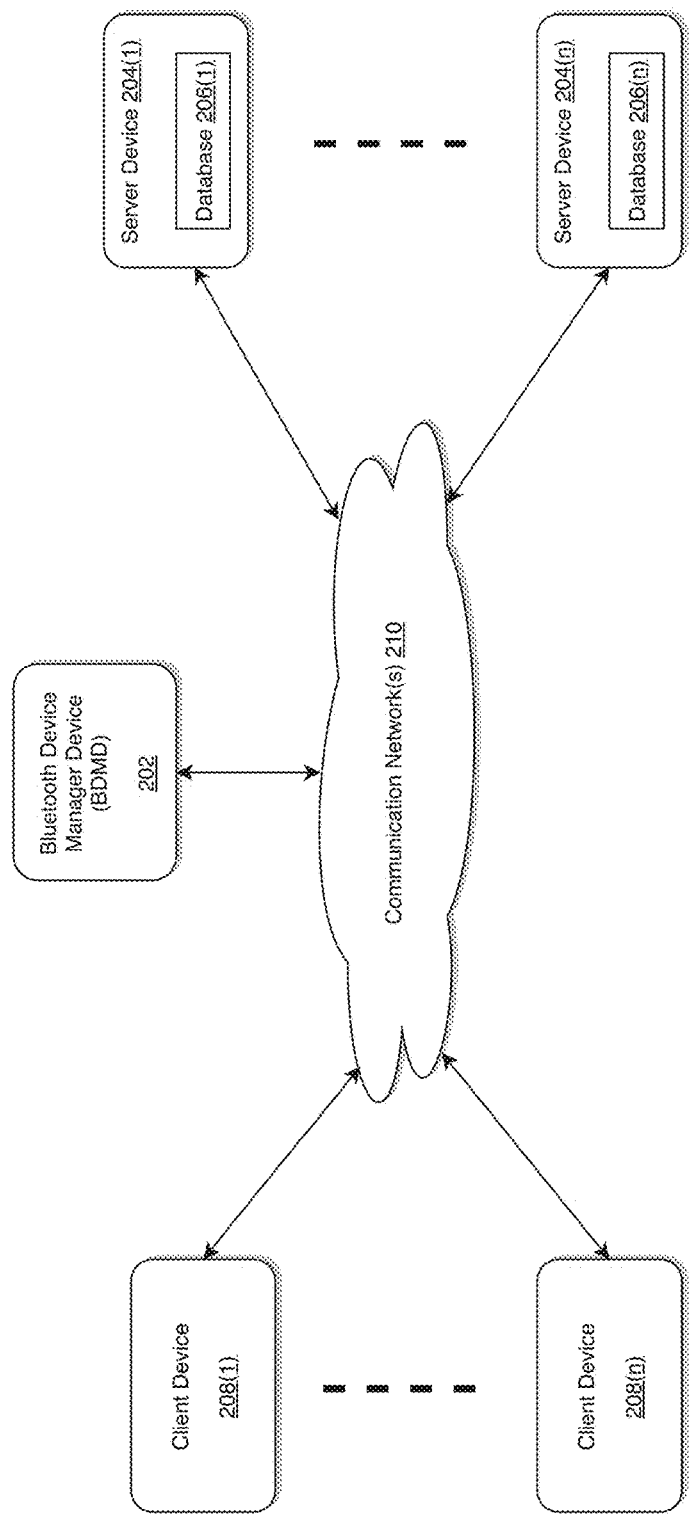
FIG. 2 illustrates an exemplary diagram of a network environment with a BT device manager device in accordance with an exemplary embodiment.

Referring to FIG. 2, a schematic of an exemplary network environment 200 for implementing a Bluetooth device manager device (BDMD) of the instant disclosure is illustrated.

According to exemplary embodiments, the above-described problems associated with conventional approach of Bluetooth management may be overcome by implementing an BDMD 202 as illustrated in FIG. 2 that may provide a platform for implementing a Bluetooth device manager module that allows users to connect their approved personal device to corporate devices, managed through a central policy engine to adhere to control and cybersecurity standards, but the disclosure is not limited thereto.

For example, the various aspects, embodiments, and/or specific features or sub-components of the instant disclosure, provide, among other features, various systems, servers, devices, methods, media, programs, and platforms for implementing a data contract management module for automatic enforcement of a data contract to significantly increase data processing speed and significantly reduce lapse time that may be necessary to manage data quality of data that is flowing between a plurality of computing devices thereby improving computer functionalities of a graphical user interface (GUI), significantly reducing utilization of computer resources, and reducing utilization of memory spaces thereby maintaining optimum memory spaces for other computer processing algorithms, but the disclosure is not limited thereto.

The BDMD 202 may be the same or similar to the computer system 102 as described with respect to FIG. 1.

The BDMD 202 may store one or more applications that can include executable instructions that, when executed by the BDMD 202, cause the BDMD 202 to perform actions, such as to transmit, receive, or otherwise process network messages, for example, and to perform other actions described and illustrated below with reference to the figures. The application(s) may be implemented as modules or components of other applications. Further, the application(s) can be implemented as operating system extensions, modules, plugins, or the like.

Even further, the application(s) may be operative in a cloud-based computing environment. The application(s) may be executed within or as virtual machine(s) or virtual server(s) that may be managed in a cloud-based computing environment. Also, the application(s), and even the BDMD 202 itself, may be located in virtual server(s) running in a cloud-based computing environment rather than being tied to one or more specific physical network computing devices. Also, the application(s) may be running in one or more virtual machines (VMs) executing on the BDMD 202. Additionally, in one or more embodiments of this technology, virtual machine(s) running on the BDMD 202 may be managed or supervised by a hypervisor.

In the network environment 200 of FIG. 2, the BDMD 202 is coupled to a plurality of server devices 204(1)-204(n) that hosts a plurality of databases 206(1)-206(n) including adaptive data storages, and also to a plurality of client devices 208(1)-208(n) via communication network(s) 210. A communication interface of the BDMD 202, such as the network interface 114 of the computer system 102 of FIG. 1, operatively couples and communicates between the BDMD 202, the server devices 204(1)-204(n), and/or the client devices 208(1)-208(n), which are all coupled together by the communication network(s) 210, although other types and/or numbers of communication networks or systems with other types and/or numbers of connections and/or configurations to other devices and/or elements may also be used.

The communication network(s) 210 may be the same or similar to the network 122 as described with respect to FIG. 1, although the BDMD 202, the server devices 204(1)-204(n), and/or the client devices 208(1)-208(n) may be coupled together via other topologies. Additionally, the network environment 200 may include other network devices such as one or more routers and/or switches, for example, which are well known in the art and thus will not be described herein.

By way of example only, the communication network(s) 210 may include local area network(s) (LAN(s)) or wide area network(s) (WAN(s)), and can use TCP/IP over Ethernet and industry-standard protocols, although other types and/or numbers of protocols and/or communication networks may be used. The communication network(s) 202 in this example may employ any suitable interface mechanisms and network communication technologies including, for example, teletraffic in any suitable form (e.g., voice, modem, and the like), Public Switched Telephone Network (PSTNs), Ethernet-based Packet Data Networks (PDNs), combinations thereof, and the like.

The BDMD 202 may be a standalone device or integrated with one or more other devices or apparatuses, such as one or more of the server devices 204(1)-204(n), for example. In one particular example, the BDMD 202 may be hosted by one of the server devices 204(1)-204(n), and other arrangements are also possible. Moreover, one or more of the devices of the BDMD 202 may be in the same or a different communication network including one or more public, private, or cloud networks, for example.

The plurality of server devices 204(1)-204(n) may be the same or similar to the computer system 102 or the computer device 120 as described with respect to FIG. 1, including any features or combination of features described with respect thereto. For example, any of the server devices 204(1)-204(n) may include, among other features, one or more processors, a memory, and a communication interface, which are coupled together by a bus or other communication link, although other numbers and/or types of network devices may be used. The server devices 204(1)-204(n) in this example may process requests received from the BDMD 202 via the communication network(s) 210 according to the HTTP-based, HTTPS-based, and/or JavaScript Object Notation (JSON) protocol, for example, although other protocols may also be used.

The server devices 204(1)-204(n) may be hardware or software or may represent a system with multiple servers in a pool, which may include internal or external networks. The server devices 204(1)-204(n) hosts the databases 206(1)-206(n) that are configured to store metadata sets, data quality rules, and newly generated data.

Although the server devices 204(1)-204(n) are illustrated as single devices, one or more actions of each of the server devices 204(1)-204(n) may be distributed across one or more distinct network computing devices that together comprise one or more of the server devices 204(1)-204(n). Moreover, the server devices 204(1)-204(n) are not limited to a particular configuration. Thus, the server devices 204(1)-204(n) may contain a plurality of network computing devices that operate using a master/slave approach, whereby one of the network computing devices of the server devices 204(1)-204(n) operates to manage and/or otherwise coordinate operations of the other network computing devices.

The server devices 204(1)-204(n) may operate as a plurality of network computing devices within a cluster architecture, a peer-to peer architecture, virtual machines, or within a cloud architecture, for example. Thus, the technology disclosed herein is not to be construed as being limited to a single environment and other configurations and architectures are also envisaged.

The plurality of client devices 208(1)-208(n) may also be the same or similar to the computer system 102 or the computer device 120 as described with respect to FIG. 1, including any features or combination of features described with respect thereto. Client device in this context refers to any computing device that interfaces to communications network(s) 210 to obtain resources from one or more server devices 204(1)-204(n) or other client devices 208(1)-208(n).

According to exemplary embodiments, the client devices 208(1)-208(n) in this example may include any type of computing device that can facilitate the implementation of the BDMD 202 that may efficiently provide a platform for implementing the BDMD 202 which may be configured to automatically handle and process a vast amount of data in a quick and expedited manner and manage quality of data received, thereby significantly increasing data processing speed and significantly reducing lapse time that may be necessary to manage data quality of data that is flowing between a plurality of computing devices, but the disclosure is not limited thereto.

The client devices 208(1)-208(n) may run interface applications, such as standard web browsers or standalone client applications, which may provide an interface to communicate with the BDMD 202 via the communication network(s) 210 in order to communicate user requests. The client devices 208(1)-208(n) may further include, among other features, a display device, such as a display screen or touchscreen, and/or an input device, such as a keyboard, for example.

Although the exemplary network environment 200 with the BDMD 202, the server devices 204(1)-204(n), the client devices 208(1)-208(n), and the communication network(s) 210 are described and illustrated herein, other types and/or numbers of systems, devices, components, and/or elements in other topologies may be used. It is to be understood that the systems of the examples described herein are for exemplary purposes, as many variations of the specific hardware and software used to implement the examples are possible, as will be appreciated by those skilled in the relevant art(s).

One or more of the devices depicted in the network environment 200, such as the BDMD 202, the server devices 204(1)-204(n), or the client devices 208(1)-208(n), for example, may be configured to operate as virtual instances on the same physical machine. For example, one or more of the BDMD 202, the server devices 204(1)-204(n), or the client devices 208(1)-208(n) may operate on the same physical device rather than as separate devices communicating through communication network(s) 210. Additionally, there may be more or fewer BDMDs 202, server devices 204(1)-204(n), or client devices 208(1)-208(n) than illustrated in FIG. 2. According to exemplary embodiments, the BDMD 202 may be configured to send code at run-time to remote server devices 204(1)-204(n), but the disclosure is not limited thereto.

In addition, two or more computing systems or devices may be substituted for any one of the systems or devices in any example. Accordingly, principles and advantages of distributed processing, such as redundancy and replication also may be implemented, as desired, to increase the robustness and performance of the devices and systems of the examples. The examples may also be implemented on computer system(s) that extend across any suitable network using any suitable interface mechanisms and traffic technologies, including by way of example only teletraffic in any suitable form (e.g., voice and modem), wireless traffic networks, cellular traffic networks, Packet Data Networks (PDNs), the Internet, intranets, and combinations thereof.

Figure 3:
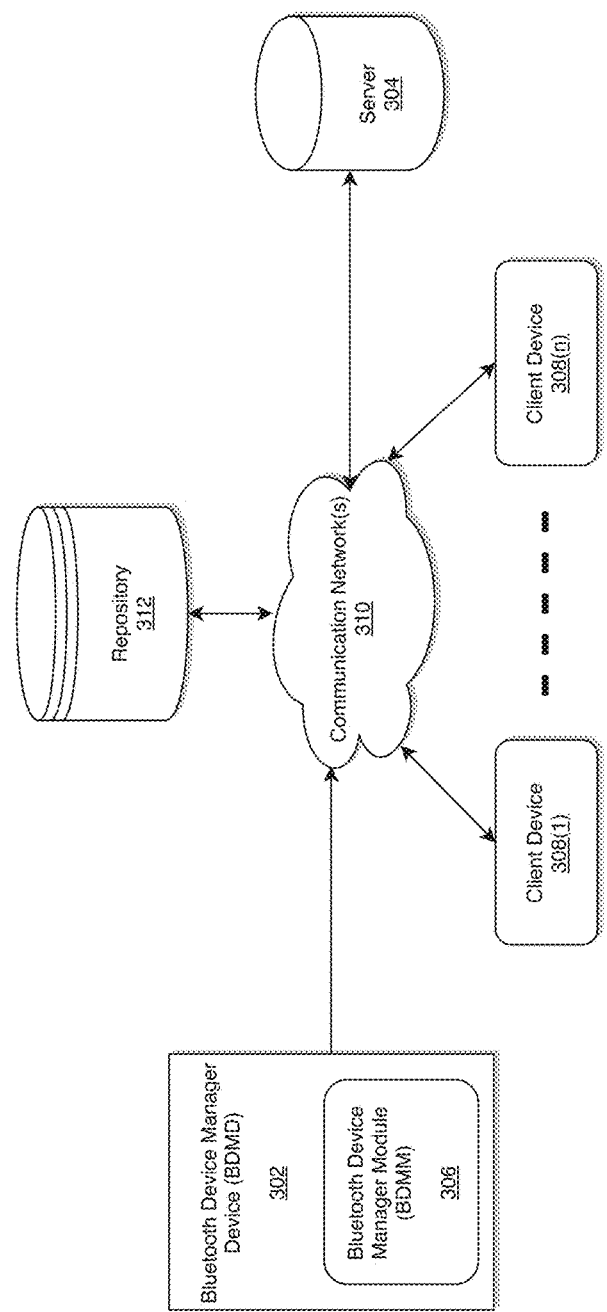
FIG. 3 illustrates a system diagram for implementing a BT device manager device having a BT device manager module in accordance with an exemplary embodiment.

FIG. 3 illustrates a system diagram 300 for implementing a BDMD having a Bluetooth device manager module (BDMM) in accordance with an exemplary embodiment.

As illustrated in FIG. 3, the BDMD 302 including the BDMM 306 may be connected to a server 304, and a repository 312 via a communication network 310. The BDMD 302 may also be connected to a plurality of client devices 308(1)-308(n) (i.e., thin client devices) via the communication network 310, but the disclosure is not limited thereto.

According to exemplary embodiment, the BDMD 302 is described and shown in FIG. 3 as including the BDMM 306, although it may include other rules, policies, modules, databases, or applications, for example. According to exemplary embodiments, the repository 312 may be embedded within the BDMD 302. Although only one repository 312 is illustrated in FIG. 3, according to exemplary embodiments, a plurality of repositories 312 may be provided. The repository 312 may include one or more memories configured to store device-based policies and user-based policies, but the disclosure is not limited thereto. For example, the repository 312 may include one or more memories configured to store information including: rules, programs, requirements, configurable threshold values defined by a product team to validate against service level objective (SLO), machine learning models, log data, hash values, etc., but the disclosure is not limited thereto. According to exemplary embodiments, the BDMM 306 may be configured to be storage platform agnostic—configured to be deployed across multiple storage layers.

According to exemplary embodiments, the BDMM 306 may be configured to receive continuous feed of data from the repository 312 via the communication network 310.

As will be described below, the BDMM 306 may be configured to establish a first communication channel between an end user application and a desktop BT device management application running on a VDI session of a remote desktop; transmit, via a second communication channel, a first command from the VDI session by utilizing the desktop BT device management application to an operating system running on a BT thin client device; scan, in response to transmitting the first command, all available BT thin client devices that are in pairing mode; display the BT thin client devices that are in pairing mode on a window of the remote desktop; receive a user input to select a desired BT thin client device from the available BT thin client devices that are in pairing mode; and transmit a second command, in response to the user input, from the operating system running on the BT thin client device to a BT dongle attached to the BT thin client device to pair the selected BT thin client device to the remote desktop, but the disclosure is not limited thereto.

The plurality of client devices 308(1)-308(n) are illustrated as being in communication with the BDMD 302. In this regard, the plurality of client devices 308(1)-308(n) may be "clients" of the BDMD 302 and are described herein as such. Nevertheless, it is to be known and understood that the plurality of client devices 308(1)-308(n) need not necessarily be "clients" of the BDMD 302, or any entity described in association therewith herein. Any additional or alternative relationship may exist between either or more of the plurality of client devices 308(1)-308(n) and the BDMD 302, or no relationship may exist.

One of the plurality of client devices 308(1)-308(n) may be, for example, a thin client device, e.g., a headset. Of course, the plurality of client devices 308(1)-308(n) may be any additional device described herein, e.g., a keyboard or a mouse. According to exemplary embodiments, the server 304 may be the same or equivalent to the server device 204 as illustrated in FIG. 2.

The process may be executed via the communication network 310, which may comprise plural networks as described above. For example, in an exemplary embodiment, either one or more of the plurality of client devices 308(1)-308(n) may communicate with the BDMD 302 via broadband or cellular communication. Of course, these embodiments are merely exemplary and are not limiting or exhaustive.

Figure 4:
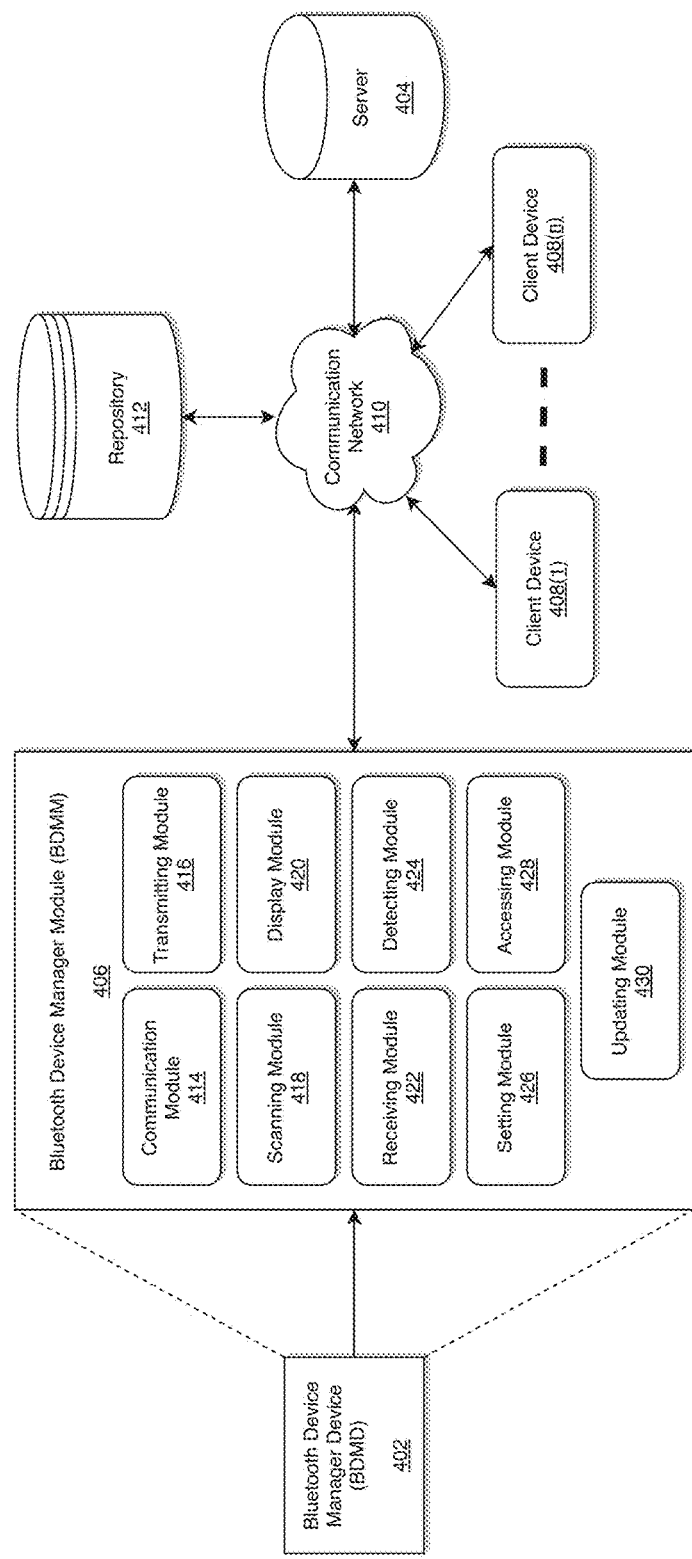
FIG. 4 illustrates a system diagram for implementing a BT device manager module of FIG. 3 in accordance with an exemplary embodiment.

FIG. 4 illustrates a system diagram having a BDMM of FIG. 3 in accordance with an exemplary embodiment.

As illustrated in FIG. 4, the system 400 may include a BDMD 402 within which a BDMM 406 may be embedded, a repository 412, a server 404, client devices 408(1)-408(n), and a communication network 410. According to exemplary embodiments, the BDMD 402, BDMM 406, repository 412, the server 404, the client devices 408(1)-408(n), and the communication network 410 as illustrated in FIG. 4 may be the same or similar to the BDMD 302, the BDMM 306, the repository 312, the server 304, the client devices 308(1)-308(n), and the communication network 310, respectively, as illustrated in FIG. 3.

According to exemplary embodiments, the repository 312, 412 may be a cloud-based repository that supports user authentication, repository security, and integration with existing databases and developments, but the disclosure is not limited thereto.

As illustrated in FIG. 4, the BDMM 406 may include a communication module 414, a transmitting module 416, a scanning module 418, a display module 420, a receiving module 422, a detecting module 424, a setting module 426, an accessing module 428 and an updating module 430. According to exemplary embodiments, the repository 412 may be external to the BDMD 402 may include various systems that are managed and operated by an organization. Alternatively, according to exemplary embodiments, the repository 412 may be embedded within the BDMD 402 and/or the BDMM 406.

The process may be executed via the communication module 428 and the communication network 410 which may comprise plural networks as described above. For example, in an exemplary embodiment, the various components of the BDMM 406 may communicate with the server 404, and the repository 412 via the communication module 428 and the communication network 410. Of course, these embodiments are merely exemplary and are not limiting or exhaustive.

According to exemplary embodiments, the communication network 410 and the communication module 426 may be configured to establish a link between the repository 412, the client devices 408(1)-408(n) and the BDMM 406.

According to exemplary embodiments, each of the communication module 414, transmitting module 416, scanning module 418, display module 420, receiving module 422, detecting module 424, setting module 426, accessing module 428 and the updating module 430 may be implemented by microprocessors or similar, they may be programmed using software (e.g., microcode) to perform various functions discussed herein and may optionally be driven by firmware and/or software. Alternatively, each of the communication module 414, transmitting module 416, scanning module 418, display module 420, receiving module 422, detecting module 424, setting module 426, accessing module 428 and the updating module 430 may be implemented by dedicated hardware, or as a combination of dedicated hardware to perform some functions and a processor (e.g., one or more programmed microprocessors and associated circuitry) to perform other functions. Also, according to exemplary embodiments, each of the communication module 414, transmitting module 416, scanning module 418, display module 420, receiving module 422, detecting module 424, setting module 426, accessing module 428 and the updating module 430 may be physically separated into two or more interacting and discrete blocks, units, devices, and/or modules without departing from the scope of the inventive concepts.

Figure 5:
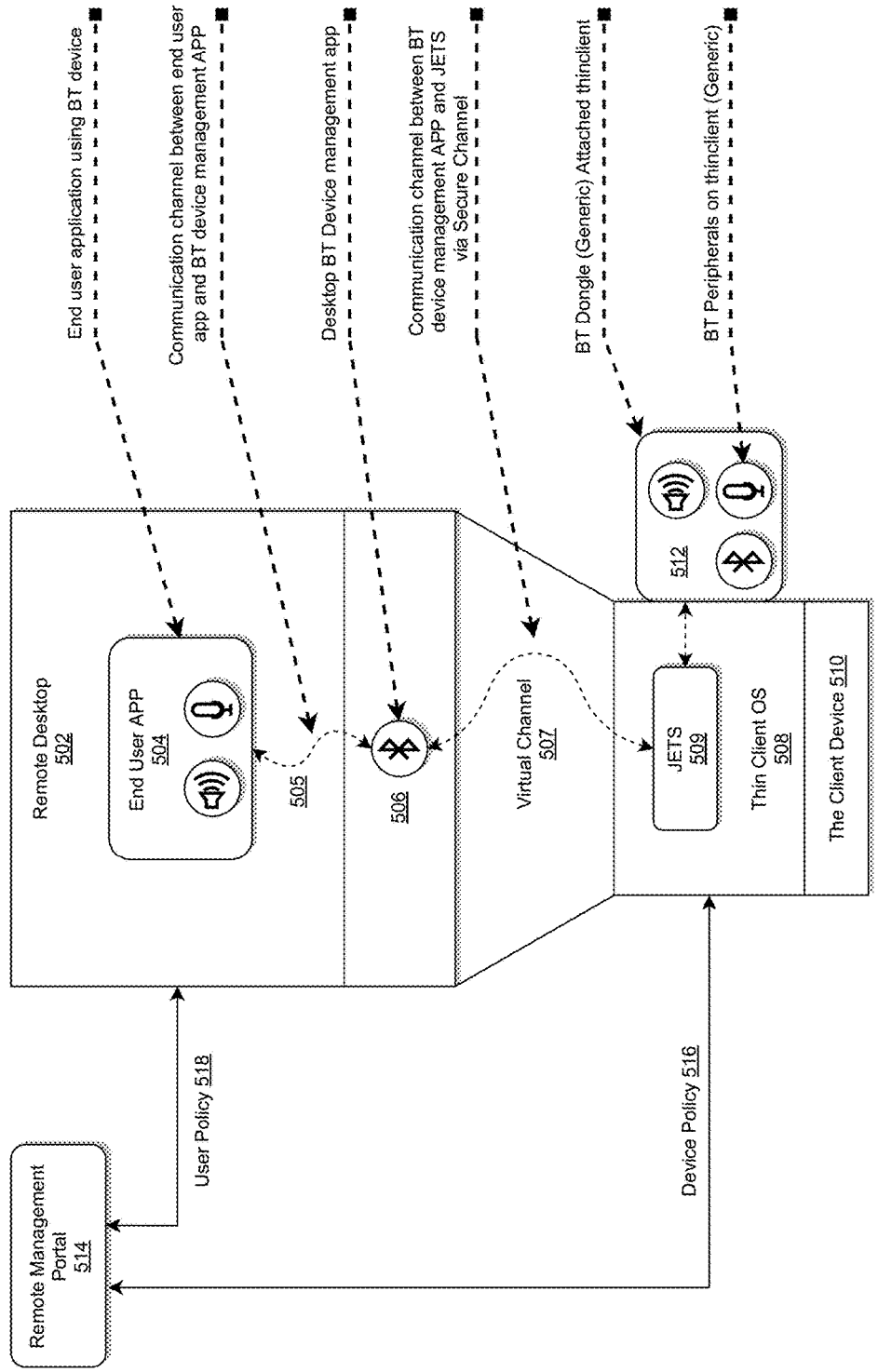
FIG. 5 illustrates an architectural flow of BT device management in accordance with an exemplary embodiment.

FIG. 5 illustrates an architectural flow 500 of BT device management in accordance with an exemplary embodiment.

Referring to FIGS. 4 and 5, according to exemplary embodiments, the communication module 414 establishes a first communication channel 505 between an end user application 504 and a desktop BT device management application (e.g., a BT icon 506) running on a VDI session of a remote desktop 502.

According to exemplary embodiments, the transmitting module 416 transmits, via a second communication channel 507 (i.e., virtual channel), a first command (e.g., command compatible on cloud-based systems (e.g., JETS 509) from the VDI session by utilizing the desktop BT device management application 506 to an operating system (e.g., thin client operating system 508) running on a BT thin client device 510.

According to exemplary embodiments, the scanning module 418 scans, in response to transmitting the first command, all available BT thin client devices that are in pairing mode.

According to exemplary embodiments, the display module 420 displays the BT thin client devices that are in pairing mode on a window of the remote desktop 502.

According to exemplary embodiments, the receiving module 422 receives a user input that triggers selection of a desired BT thin client device from the available BT thin client devices that are in pairing mode.

According to exemplary embodiments, the transmitting module 416 transmits a second command, in response to the received user input, from the operating system (i.e., thin client operating system 508) running on the BT thin client device 510 to a BT dongle 512 attached to the BT thin client device 510 to pair the selected BT thin client device to the remote desktop 502.

According to exemplary embodiments, the operating system may be a Linux operating system running on the thin client device 510 supporting a cloud-based system or platform (e.g., JETS), but the disclosure is not limited thereto. For example, the operating system may also be Mac OSX, Windows 10, or Unix, or Linux flavors.

According to exemplary embodiments, the second communication channel may be a secured virtual channel 507.

According to exemplary embodiments, the BT thin client device 510 may be a device embedded with a headset, or a keyboard, or a mouse, but the disclosure is not limited thereto.

According to exemplary embodiments, the BT dongle 512 that is attached to the BT thin client device 510 may be located external to the remote desktop 502.

According to exemplary embodiments, wherein in response to the pairing of the selected desired BT thin client device 510 to the remote desktop 502, the remote desktop 502 may run a data center whereas an actual physical machine of the BT dongle 512 that runs the remote desktop 502 may be located in the BT thin client device 510.

According to exemplary embodiments, the display module may display a BT icon 506 on a task bar of the remote desktop 502 to ensure that a secured connection has been established between the remote desktop 502 and the BT dongle 512.

According to exemplary embodiments, the setting module 425 may set a predefined perimeter around the remote desktop 502. The detecting module 424 may detect that the BT thin client device 510 is outside of the predefined perimeter. In response, the BDMM 406 may automatically disconnect the pair between the remote desktop 502 and the BT dongle 512, thereby disconnecting the selected BT thin client device.

According to exemplary embodiments, the communication module 414 may establish a secured connection (via the virtual channel 507) between the remote desktop 502 and the BT dongle 512. The BDMM 406 may store information onto a database 412 indicating that the BT thin client device 510 is a trusted thin client device. The setting module 426 may set a predefined perimeter around the remote desktop 502. The detecting module 424 may detect that the BT thin client device 510 is outside of the predefined perimeter. In response, the BDMM 406 may automatically disconnect the pair between the remote desktop 502 and the BT dongle 512. According to exemplary embodiments, when the detecting module 424 detects that the BT thin client device 510 is again inside of the predefined perimeter for a consecutive time (e.g., consecutive days of connections), the BDMM 406 may automatically connects the pair between the remote desktop 502 and the BT dongle 512, thereby automatically connecting the selected BT thin client device.

According to exemplary embodiments, a remote management portal 514 may be provided that may be in communication with the thin client device 510. According to exemplary embodiments, the setting module 426 may set, by utilizing the remote management portal 514, a device-based policy 516 for each of the BT thin client devices indicating whether such BT thin client device is authorized for connecting to the remote desktop 502. The BDMM 406 may maintain a list of authorized BT thin client devices on the remote management portal 514 based the device-based policy 516. The accessing module 428 may periodically access, by the thin client operating system 508, the remote management portal 514 to read the device-based policy 516 when the second command is detected by the detecting module 424. The updating module 430 may refresh, by the thin client operating system 508, the device-based policy 516 when it is determined by the detecting module 424 that an unauthorized BT thin client device is seeking connection and update the list of authorized BT thin client devices based on the refreshed device-based policy.

According to exemplary embodiments, a remote management portal 514 may also be in communication with the remote desktop 502. According to exemplary embodiments, the setting module 426 may set, by utilizing the remote management portal 514, a user-based policy 518 for each user indicating whether such user is authorized for connecting to the remote desktop 502. The BDMM 406 may maintain a list of authorized users on the remote management portal 514 based the user-based policy 518. The accessing module 428 may periodically access, by the remote desktop 502, the remote management portal 514 to read the user-based policy 516 when the second command is detected by the detecting module 424. The updating module 430 may refresh, by the remote desktop 502, the user-based policy 518 when it is determined by the detecting module 424 that an unauthorized user is seeking connection to the remote desktop 502 and update the list of authorized users based on the refreshed device-based policy.

According to exemplary embodiments, the BDMM 406 may allow a user to better control allowed and disallowed devices, for example, limiting down to specific devices or manufacturers, but the disclosure is not limited thereto.

According to exemplary embodiments, the BDMM 406 may be configured to build central policies to ensure that only administrators can control device settings, thereby delivering a simple user interface to allow users to pair and manage their own devices, within the realms of what is permitted in the policies, but the disclosure is not limited thereto.

According to exemplary embodiments, the BDMM 406 may be configured to certify a standard and globally available BT dongle for the thin-client device 510.

According to exemplary embodiments, the BDMM 406 may be configured to run the BT connectivity at startup as a service; provide central management policies; remember devices by user and allow roaming between endpoints; and auto disconnect after a predetermined X duration or a predetermined Y local time.

According to exemplary embodiments, BDMM 406 may be configured to restrict only audio thin client device to be displayed on the window of the remote desktop 502 for selection for BT connection.

According to exemplary embodiments, the BDMM 406 may ensure that certain LOBs, countries, or geographies can be excluded from this capabilities where regulations disallow Blue Tooth.

According to exemplary embodiments, the BDMM 406 may request supported command-sets and capabilities from the attached thin client device 510, including manufacture specifics; and control functionalities of the thin client device 510 from the end user application 504 as necessary (e.g., power transmission, echo cancellation, etc. but the disclosure is not limited thereto).

Figure 6:
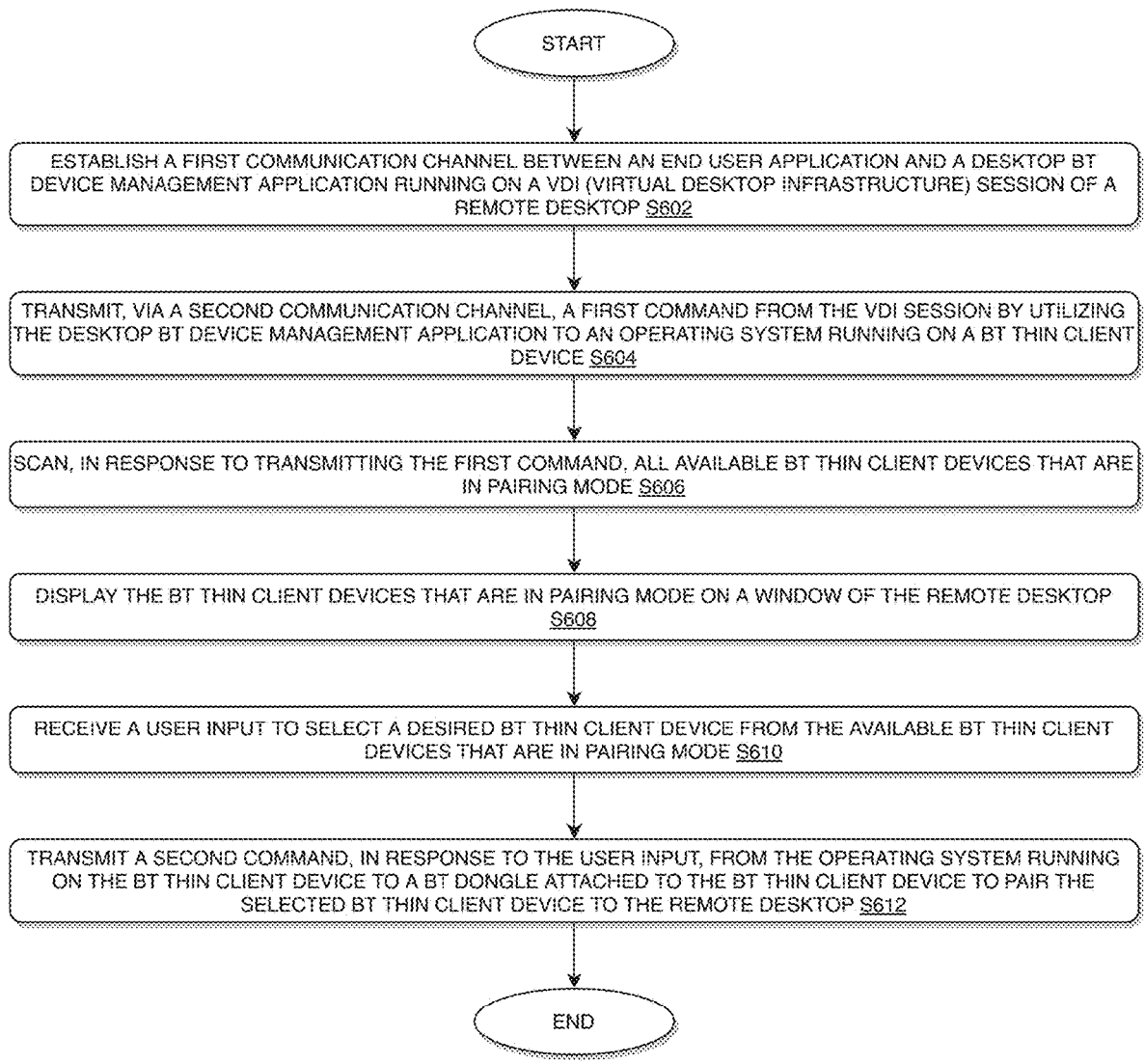
FIG. 6 illustrates a flow chart of BT device management process in accordance with an exemplary embodiment.

FIG. 6 illustrates a flow chart of BT device management process in accordance with an exemplary embodiment. It will be appreciated that the illustrated process 600 and associated steps may be performed in a different order, with illustrated steps omitted, with additional steps added, or with a combination of reordered, combined, omitted, or additional steps.

At step S602, the process 600 may include establishing a first communication channel between an end user application and a desktop BT device management application running on a VDI (virtual desktop infrastructure) session of a remote desktop.

At step S604, the process 600 may include transmitting, via a second communication channel, a first command from the VDI session by utilizing the desktop BT device management application to an operating system running on a BT thin client device.

At step S606, the process 600 may include scanning, in response to transmitting the first command, all available BT thin client devices that are in pairing mode.

At step S608, the process 600 may include displaying the BT thin client devices that are in pairing mode on a window of the remote desktop.

At step S610, the process 600 may include receiving a user input to select a desired BT thin client device from the available BT thin client devices that are in pairing mode.

At step S612, the process 600 may include transmitting a second command, in response to the user input, from the operating system running on the BT thin client device to a BT dongle attached to the BT thin client device to pair the selected BT thin client device to the remote desktop.

According to exemplary embodiments, the process 600 may further include other functionalities as disclosed herein with respect to FIGS. 1-5.

For example, according to exemplary embodiments, the process 600 may further include: displaying a BT icon on a task bar of the remote desktop to ensure that a secured connection has been established between the remote desktop and the BT dongle.

According to exemplary embodiments, the process 600 may further include: setting a predefined perimeter around the remote desktop; detecting that the BT thin client device is outside of the predefined perimeter; and automatically disconnecting the pair between the remote desktop and the BT dongle.

According to exemplary embodiments, the process 600 may further include: establishing a secured connection between the remote desktop and the BT dongle; storing information onto a database indicating that the BT thin client device is a trusted thin client device; setting a predefined perimeter around the remote desktop; detecting that the BT thin client device is outside of the predefined perimeter; automatically disconnecting the pair between the remote desktop and the BT dongle; detecting that the BT thin client device is again inside of the predefined perimeter for a consecutive time; and automatically connecting the pair between the remote desktop and the BT dongle.

According to exemplary embodiments, the process 600 may further include: providing a remote management portal; setting, by utilizing the remote management portal, a device-based policy for each of the BT thin client devices indicating whether such BT thin client device is authorized for connecting to the remote desktop; maintaining a list of authorized BT thin client devices on the remote management portal based the device-based policy; periodically accessing, by the operating system, the remote management portal to read the device-based policy when the second command is detected; refreshing, by the operating system, the device-based policy when it is determined that an unauthorized BT thin client device is seeking connection; and updating the list of authorized BT thin client devices based on the refreshed device-based policy.

According to exemplary embodiments, the process 600 may further include: providing a remote management portal; setting, by utilizing the remote management portal, a user-based policy for each user who is authorized for connecting to the remote desktop; maintaining a list of authorized users on the remote management portal based the user-based policy; periodically accessing, by the VDI session running on the remote desktop, the remote management portal to read the user-based policy when the second command is detected; refreshing, by the VDI session running on the remote desktop, the user-based policy when it is determined that an unauthorized user is seeking connection; and updating the list of authorized users based on the refreshed user-based policy.

According to exemplary embodiments, the process 600 may further include requesting supported command-sets and capabilities from the attached BT thin client device, including manufacture specifics; and controlling functionalities of the BT thin client device from the end user application as necessary (e.g., power transmission, echo cancellation, etc. but the disclosure is not limited thereto).

According to exemplary embodiments, the BDMD 402 may include a memory (e.g., a memory 106 as illustrated in FIG. 1) which may be a non-transitory computer readable medium that may be configured to store instructions for implementing BDMM 406 for BT device management. The computing device BDMD 402 may also include a medium reader (e.g., a medium reader 112 as illustrated in FIG. 1) which may be configured to read any one or more sets of instructions, e.g., software, from any of the memories described herein. The instructions, when executed by a processor (e.g., a processor 104 as illustrated in FIG. 1) embedded within the BDMM 406 or within the BDMD 402, may be used to perform one or more of the methods and processes as described herein. In a particular embodiment, the instructions may reside completely, or at least partially, within the memory 106, the medium reader 112, and/or the processor 104 (see FIG. 1) during execution by the BDMD 402.

For example, the instructions, when executed, may cause the processor 104 to perform the following: establishing a first communication channel between an end user application and a desktop BT device management application running on a VDI (virtual desktop infrastructure) session of a remote desktop; transmitting, via a second communication channel, a first command from the VDI session by utilizing the desktop BT device management application to an operating system running on a BT thin client device; scanning, in response to transmitting the first command, all available BT thin client devices that are in pairing mode; displaying the BT thin client devices that are in pairing mode on a window of the remote desktop; receiving a user input to select a desired BT thin client device from the available BT thin client devices that are in pairing mode; and transmitting a second command, in response to the user input, from the operating system running on the BT thin client device to a BT dongle attached to the BT thin client device to pair the selected BT thin client device to the remote desktop.

According exemplary embodiments, the instructions, when executed, may further cause the processor 104 to: cause a display to display a BT icon on a task bar of the remote desktop to ensure that a secured connection has been established between the remote desktop and the BT dongle.

According to exemplary embodiments, the instructions, when executed, may further cause the processor 104 to: set a predefined perimeter around the remote desktop; detect that the BT thin client device is outside of the predefined perimeter; and automatically disconnect the pair between the remote desktop and the BT dongle.

According exemplary embodiments, the instructions, when executed, may further cause the processor 104 to: establish a secured connection between the remote desktop and the BT dongle; store information onto a database indicating that the BT thin client device is a trusted thin client device; set a predefined perimeter around the remote desktop; detect that the BT thin client device is outside of the predefined perimeter; automatically disconnect the pair between the remote desktop and the BT dongle; detect that the BT thin client device is again inside of the predefined perimeter for a consecutive time; and automatically connect the pair between the remote desktop and the BT dongle.

According exemplary embodiments, the instructions, when executed, may further cause the processor 104 to: set, by utilizing a remote management portal, a device-based policy for each of the BT thin client devices indicating whether such BT thin client device is authorized for connecting to the remote desktop; maintain a list of authorized BT thin client devices on the remote management portal based the device-based policy; periodically access, by the operating system, the remote management portal to read the device-based policy when the second command is detected; refresh, by the operating system, the device-based policy when it is determined that an unauthorized BT thin client device is seeking connection; and update the list of authorized BT thin client devices based on the refreshed device-based policy.

According exemplary embodiments, the instructions, when executed, may further cause the processor 104 to: set, by utilizing a remote management portal, a user-based policy for each user who is authorized for connecting to the remote desktop; maintain a list of authorized users on the remote management portal based the user-based policy; periodically access, by the VDI session running on the remote desktop, the remote management portal to read the user-based policy when the second command is detected; refresh, by the VDI session running on the remote desktop, the user-based policy when it is determined that an unauthorized user is seeking connection; and update the list of authorized users based on the refreshed user-based policy.

Thus, the exemplary embodiments disclosed herein with reference to FIGS. 1-6 may provide platforms for implementing a BT device manager module that allows users to connect their approved personal device to corporate devices, managed through a central policy engine to adhere to control and cybersecurity standards, but the disclosure is not limited thereto. For example, the various aspects, embodiments, and/or specific features or sub-components of the exemplary embodiments disclosed herein with reference to FIGS. 1-6, may provide, among other features, various systems, servers, devices, methods, media, programs, and platforms for implementing a BT device manager module that may be configured to build central policies to ensure that only administrators can control device settings, thereby delivering a simple user interface to allow users to pair and manage their own devices, within the realms of what is permitted in the policies, but the disclosure is not limited thereto.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the present disclosure in its aspects. Although the invention has been described with reference to particular means, materials and embodiments, the invention is not intended to be limited to the particulars disclosed;

rather the invention extends to all functionally equivalent structures, methods, and uses such as are within the scope of the appended claims.

For example, while the computer-readable medium may be described as a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the embodiments disclosed herein.

The computer-readable medium may comprise a non-transitory computer-readable medium or media and/or comprise a transitory computer-readable medium or media. In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. Accordingly, the disclosure is considered to include any computer-readable medium or other equivalents and successor media, in which data or instructions may be stored.

Although the present application describes specific embodiments which may be implemented as computer programs or code segments in computer-readable media, it is to be understood that dedicated hardware implementations, such as application specific integrated circuits, programmable logic arrays and other hardware devices, can be constructed to implement one or more of the embodiments described herein. Applications that may include the various embodiments set forth herein may broadly include a variety of electronic and computer systems. Accordingly, the present application may encompass software, firmware, and hardware implementations, or combinations thereof. Nothing in the present application should be interpreted as being implemented or implementable solely with software and not hardware.

Although the present specification describes components and functions that may be implemented in particular embodiments with reference to particular standards and protocols, the disclosure is not limited to such standards and protocols. Such standards are periodically superseded by faster or more efficient equivalents having essentially the same functions. Accordingly, replacement standards and protocols having the same or similar functions are considered equivalents thereof.

The illustrations of the embodiments described herein are intended to provide a general understanding of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method for implementing a Bluetooth (BT) device manager module for BT device management by utilizing one or more processors and one or more memories, the method comprising:
   establishing a first secured communication channel between an end user application and a desktop BT device management application running on a VDI (virtual desktop infrastructure) session of a remote desktop;
   transmitting, via a second secured communication channel, a first command from the VDI session by utilizing the desktop BT device management application to an operating system running on a BT thin client device;
   scanning, in response to transmitting the first command, all available BT thin client devices that are in pairing mode;
   displaying the BT thin client devices that are in pairing mode on a window of the remote desktop;
   receiving a user input to select a desired BT thin client device from the available BT thin client devices that are in pairing mode; and
   transmitting a second command, in response to the user input, from the operating system running on the BT thin client device to a BT dongle attached to the BT thin client device to pair the selected BT thin client device to the remote desktop.

2. The method according to claim 1, wherein the second communication channel is a secured virtual channel.

3. The method according to claim 1, wherein the operating system is a Linux operating system.

4. The method according to claim 1, wherein the BT thin client device is a headset, or a keyboard, or a mouse.

5. The method according to claim 1, wherein the BT dongle that is attached to the BT thin client device is located external to the remote desktop.

6. The method according to claim 5, wherein in response to the pairing of the selected desired BT thin client device to the remote desktop, the remote desktop runs a data center whereas an actual physical machine of the BT dongle that runs the remote desktop is located in the BT thin client device.

7. The method according to claim 1, further comprising:
displaying a BT icon on a task bar of the remote desktop to ensure that a secured connection has been established between the remote desktop and the BT dongle.

8. The method according to claim 1, further comprising:
setting a predefined perimeter around the remote desktop;
detecting that the BT thin client device is outside of the predefined perimeter; and
automatically disconnecting the pair between the remote desktop and the BT dongle.

9. The method according to claim 1, further comprising:
establishing a secured connection between the remote desktop and the BT dongle;
storing information onto a database indicating that the BT thin client device is a trusted thin client device;
setting a predefined perimeter around the remote desktop;
detecting that the BT thin client device is outside of the predefined perimeter;
automatically disconnecting the pair between the remote desktop and the BT dongle;
detecting that the BT thin client device is again inside of the predefined perimeter for a consecutive time; and
automatically connecting the pair between the remote desktop and the BT dongle.

10. The method according to claim 1, further comprising:
providing a remote management portal;
setting, by utilizing the remote management portal, a device-based policy for each of the BT thin client devices indicating whether such BT thin client device is authorized for connecting to the remote desktop;
maintaining a list of authorized BT thin client devices on the remote management portal based the device-based policy;
periodically accessing, by the operating system, the remote management portal to read the device-based policy when the second command is detected;
refreshing, by the operating system, the device-based policy when it is determined that an unauthorized BT thin client device is seeking connection; and
updating the list of authorized BT thin client devices based on the refreshed device-based policy.

11. The method according to claim 1, further comprising:
providing a remote management portal;
setting, by utilizing the remote management portal, a user-based policy for each user who is authorized for connecting to the remote desktop;
maintaining a list of authorized users on the remote management portal based the user-based policy;
periodically accessing, by the VDI session running on the remote desktop, the remote management portal to read the user-based policy when the second command is detected;
refreshing, by the VDI session running on the remote desktop, the user-based policy when it is determined that an unauthorized user is seeking connection; and
updating the list of authorized users based on the refreshed user-based policy.

12. A system for implementing a Bluetooth (BT) device manager module for BT device management, the system comprising:
a processor and one or more memories operatively connected to the processor via a communication network, wherein the processor is configured to:
establish a first communication channel between an end user application and a desktop BT device management application running on a VDI (virtual desktop infrastructure) session of a remote desktop;
transmit, via a second communication channel, a first command from the VDI session by utilizing the desktop BT device management application to an operating system running on a BT thin client device;
scan, in response to transmitting the first command, all available BT thin client devices that are in pairing mode;
display the BT thin client devices that are in pairing mode on a window of the remote desktop;
receive a user input to select a desired BT thin client device from the available BT thin client devices that are in pairing mode; and
transmit a second command, in response to the user input, from the operating system running on the BT thin client device to a BT dongle attached to the BT thin client device to pair the selected BT thin client device to the remote desktop.

13. The system according to claim 12, wherein:
the second communication channel is a secured virtual channel;
the operating system is a Linux operating system; and
the BT thin client device is a headset, or a keyboard, or a mouse.

14. The system according to claim 12, wherein the BT dongle that is attached to the BT thin client device is located external to the remote desktop and wherein in response to the pairing of the selected desired BT thin client device to the remote desktop, the remote desktop runs a data center whereas an actual physical machine of the BT dongle that runs the remote desktop is located in the BT thin client device.

15. The system according to claim 12, wherein the processor is further configured to:
cause a display to display a BT icon on a task bar of the remote desktop to ensure that a secured connection has been established between the remote desktop and the BT dongle.

16. The system according to claim 12, wherein the processor is further configured to:
set a predefined perimeter around the remote desktop;
detect that the BT thin client device is outside of the predefined perimeter; and
automatically disconnect the pair between the remote desktop and the BT dongle.

17. The system according to claim 12, wherein the processor is further configured to:
establish a secured connection between the remote desktop and the BT dongle;

store information onto a database indicating that the BT thin client device is a trusted thin client device;
set a predefined perimeter around the remote desktop;
detect that the BT thin client device is outside of the predefined perimeter;
automatically disconnect the pair between the remote desktop and the BT dongle;
detect that the BT thin client device is again inside of the predefined perimeter for a consecutive time; and
automatically connect the pair between the remote desktop and the BT dongle.

18. The system according to claim 12, further comprising a remote management portal and wherein the processor is further configured to:
set, by utilizing the remote management portal, a device-based policy for each of the BT thin client devices indicating whether such BT thin client device is authorized for connecting to the remote desktop;
maintain a list of authorized BT thin client devices on the remote management portal based the device-based policy;
periodically access, by the operating system, the remote management portal to read the device-based policy when the second command is detected;
refresh, by the operating system, the device-based policy when it is determined that an unauthorized BT thin client device is seeking connection; and
update the list of authorized BT thin client devices based on the refreshed device-based policy.

19. The system according to claim 12, further comprising a remote management portal and wherein the processor is further configured to:
set, by utilizing the remote management portal, a user-based policy for each user who is authorized for connecting to the remote desktop;
maintain a list of authorized users on the remote management portal based the user-based policy;
periodically access, by the VDI session running on the remote desktop, the remote management portal to read the user-based policy when the second command is detected;
refresh, by the VDI session running on the remote desktop, the user-based policy when it is determined that an unauthorized user is seeking connection; and
update the list of authorized users based on the refreshed user-based policy.

20. A non-transitory computer readable medium configured to store instructions for implementing a Bluetooth (BT) device manager module for BT device management, wherein, when executed, the instructions cause a processor to perform the following:
establishing a first communication channel between an end user application and a desktop BT device management application running on a VDI (virtual desktop infrastructure) session of a remote desktop;
transmitting, via a second communication channel, a first command from the VDI session by utilizing the desktop BT device management application to an operating system running on a BT thin client device;
scanning, in response to transmitting the first command, all available BT thin client devices that are in pairing mode;
displaying the BT thin client devices that are in pairing mode on a window of the remote desktop;
receiving a user input to select a desired BT thin client device from the available BT thin client devices that are in pairing mode; and
transmitting a second command, in response to the user input, from the operating system running on the BT thin client device to a BT dongle attached to the BT thin client device to pair the selected BT thin client device to the remote desktop.

\* \* \* \* \*